June 28, 1966  J. W. DONNELLY  3,258,322
APPARATUS FOR FORMING GLASSWARE
Filed Aug. 25, 1960  3 Sheets-Sheet 2

INVENTOR.
JOSEPH W. DONNELLY
BY
Arthur H. Seidel
ATTORNEY

June 28, 1966  J. W. DONNELLY  3,258,322
APPARATUS FOR FORMING GLASSWARE
Filed Aug. 25, 1960  3 Sheets-Sheet 3
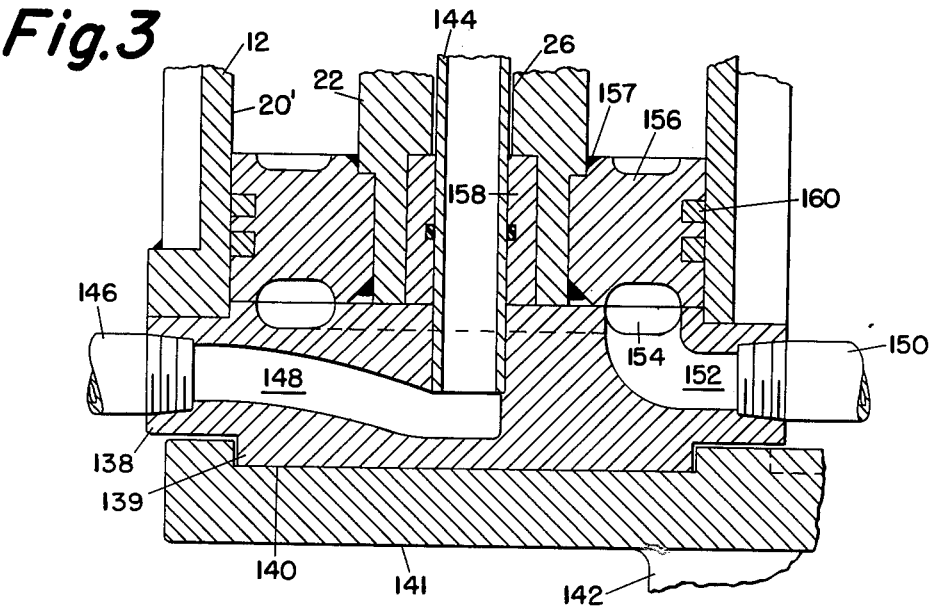
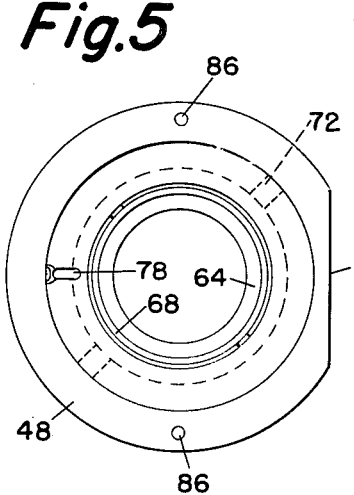
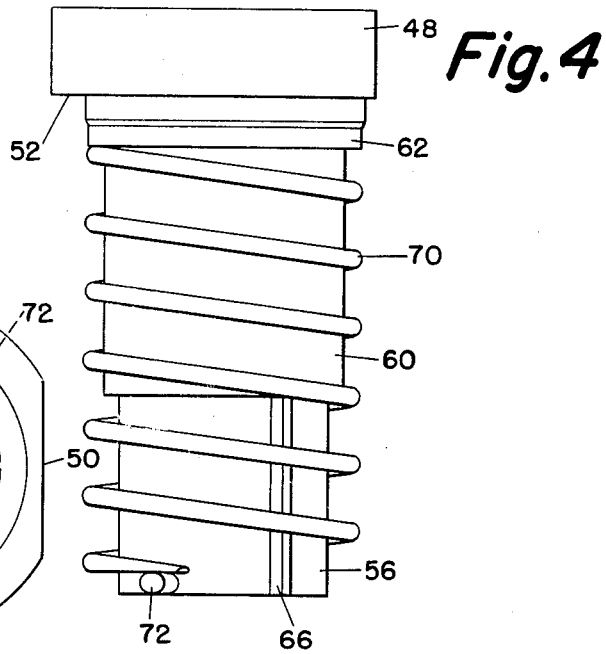
INVENTOR.
JOSEPH W. DONNELLY
BY Arthur H. Seidel
ATTORNEY

United States Patent Office 3,258,322
Patented June 28, 1966

3,258,322
APPARATUS FOR FORMING GLASSWARE
Joseph W. Donnelly, Vineland, N.J., assignor to Maul Brothers, Inc., Millville, N.J., a corporation of New Jersey
Filed Aug. 25, 1960, Ser. No. 51,904
7 Claims. (Cl. 65—167)

This invention relates to apparatus for forming glassware. More particularly, this invention relates to apparatus for forming glassware wherein means are provided for converting the operation of the machine from a press-and-blow method to a blow-and-blow method.

Glassware machinery can operate by what is known as the press-and-blow method and also by what is known as the blow-and-blow method. In a press-and-blow method, a charge of molten glass is delivered to a mold and pressed by means of a reciprocating plunger to the shape of the interior cavity of the mold which is generally known as a "blank" mold. The blank so produced is then transferred to a blow mold, and by means of air, is blown to final form.

In the blow-and-blow method, the charge is delivered into a "parison" mold where it is shaped by means of air to conform to the interior cavity thereof to form a "parison." In this method, the neck of the glassware is formed first, and then the remainder of the glassware is formed by expanding the parison by pressurized air. The press-and-blow method is best suited for the manufacture of wide-mouth glassware whereas the blow-and-blow method is best suited for narrow-neck glassware.

The blow-and-blow method of forming glassware is explained in U.S. Patent 2,402,234 which disclosure is incoporated herewith. The press-and-blow method is described in U.S. Patent 2,508,891. The present invention is more particularly directed to a means removable as a unit for readily converting apparatus for forming glassware from operation in a press-and-blow method to a blow-and-blow method, and vice versa. Apparatus for forming glassware having means for converting the machine from a press-and-blow method to a blow-and-blow method is disclosed in U.S. Patent 2,702,444. In said last-mentioned patent, the means for converting the machinery requires removable elements, each individually removable, in addition to the removal of the plunger. Thus, the last-mentioned patent does not provide a conversion means which is removable as a unit.

The present invention provides a conversion means removable as a unit thereby substantially reducing the down-time required in converting a machine from a press-and-blow method to a blow-and-blow method. In addition, the present invention incorporates the plunger positioner within the conversion means which is removable therewith.

It is an object of the present invention to provide an apparatus for forming glassware having a means removable as a unit for converting a machine from a press-and-blow method to a blow-and-blow method, and vice versa.

It is another object of the present invention to provide individually controlled means for forming a glass blank in one mold independent of the formation of a blank in another mold, said individually controlled means being capable of vertical adjustment simultaneously as a unit.

It is still another object of the present invention to provide a novel apparatus for forming glassware having a plurality of pressing plungers in a single apparatus to form substantially simultaneously a plurality of hollow glass parisons.

It is still another object of the present invention to provide readily removable plunger positioners capable of converting apparatus for forming glassware from a press-and-blow method to a blow-and-blow method within a minimum amount of time by even the most unskilled workers.

Other objects will appear hereinafter.

For the purpose of illustrating the invention there is shown in the drawings forms which are presently preferred; it being understood, however, that this invention is not limited to the precise arrangements and instrumentalities shown.

FIGURE 3 is a vertical sectional view of the lower portion of the cylinder casing of FIGURE 2.

FIGURE 4 is a elevation view of the plunger positioner shown in FIGURE 1.

FIGURE 5 is a top plan view of the plunger positioner shown in FIGURE 4.

Figure 1:
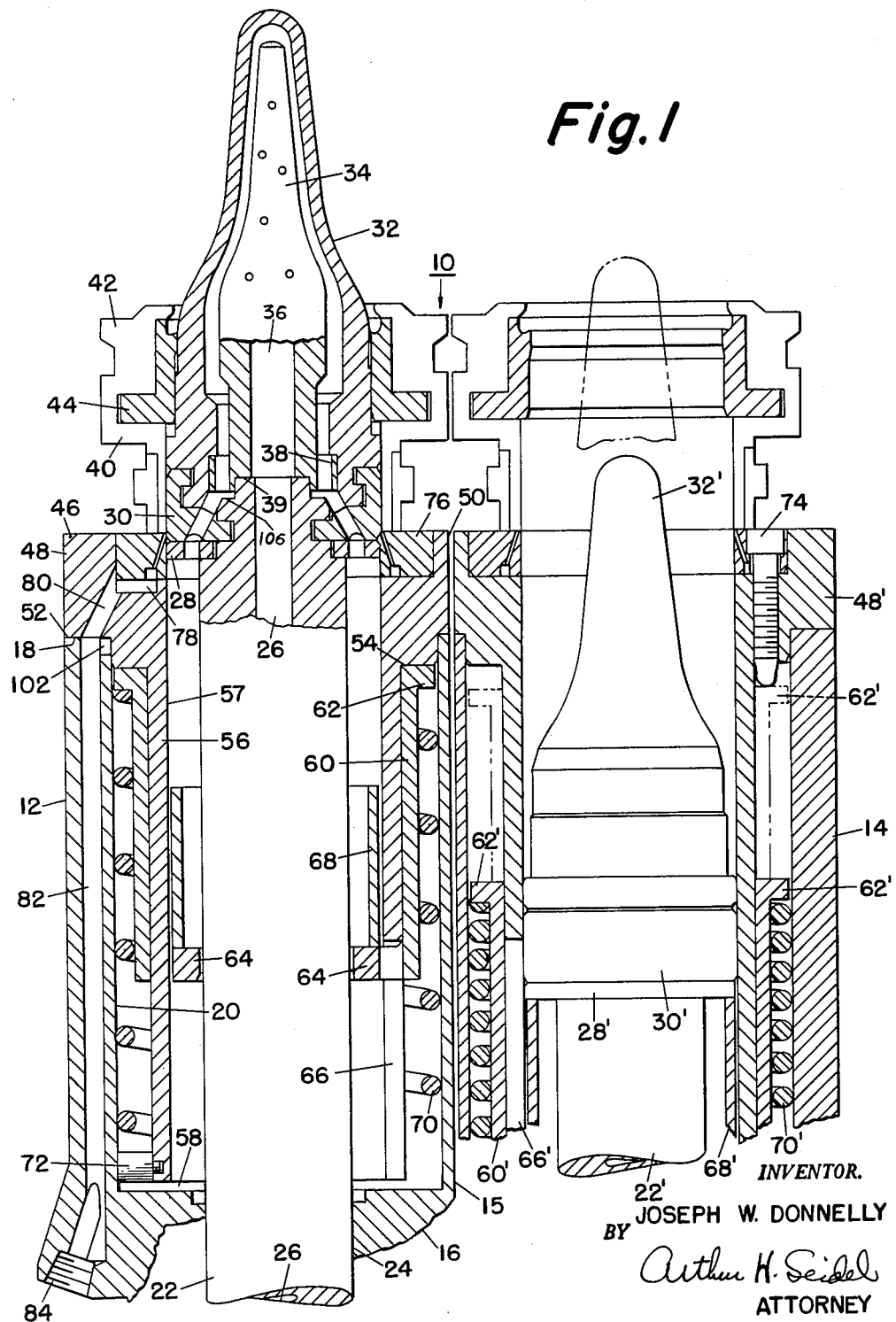
FIGURE 1 is a vertical sectional view through the upper portion of a parison forming assembly operable by the press-and-blow method to form wide-mouth glassware.

Referring to the drawings in detail, wherein like numerals indicate like elements, there is shown in FIGURE 1 a parison forming assembly designated generally as 10. The assembly 10 is an integral part of an apparatus for forming glassware by the press-and-blow method.

The assembly 10 comprises a pair of generally cylindrical casings 12 and 14 juxtaposed to one another so that the apparatus of the present invention can form substantially simultaneously a plurality of hollow glass parisons. Each of the casings 12 and 14 are provided with a milled flat portion 15, the purpose of which is described in my copending application entitled "Glass Forming Apparatus Having Self-Accommodating Plungers," now Pat. No. 3,190,188, Serial No. 51,829 and filed on August 25, 1960.

The cylindrical casings 12 and 14 are identical, therefore it is deemed sufficient to only describe casing 12 and ing elements therein in detail. The elements within casing 14 corresponding to the elements in casing 12 are shown with identical numerals which are primed.

The casing 12 is provided with an internal bore which is interrupted by the wall 16 which is disposed intermediate the length of the casing 12. The cylinder bore extending from the wall 16 to the open end 18 of the casing 12 is designated as 20. The cylinder bore below the wall 16 is designated as 20'. A piston rod 22 extends through a bore 24 in the wall 16. The piston rod 22 is provided with a longitudinal bore 26 for a purpose to be made clear hereinafter. The end of the piston rod, as shown more clearly in FIGURE 1, is provided with a series of shoulders. A washer 28 is disposed on the outermost shoulder on the upper end of the piston rod 22. A pair of split rings 30 are disposed on a shoulder on the piston rod 22 above the washer 28. A plunger 32 is mounted on the end of the piston rod 22 by the split rings 30. A coolant pipe 34 is disposed within the plunger 32 abutting the upper end 39 of rod 22, and is provided with a bore 36 coextensive with the bore 26 in the piston rod 22. The coolant pipe 34 is provided with a flange 38 having apertures which are coextensive with apertures in the split rings 30 and the washer 28.

Complementary portions 40 of the neck mold 42 are disposed around the lowermost portion of the plunger 32 in the position of the plunger 32 as shown in the lefthand portion of FIGURE 1. The structure of the neck mold 42 and its interrelationship with the body mold (not shown) per se forms no part of the present invention. The neck mold 42 is formed of half sections, as is conventional in the art, and operatively carries the support thimble 44.

A plunger positioner unit 46 is provided so that the assembly shown in FIGURE 1 may be operable to make glassware by the press-and-blow method. The plunger positioner unit 46 comprises a cylindrical body 48 having a flat portion 50 coinciding with the flat portion 15 on the casing 12. The cylindrical body 48 is provided with a first shoulder 52 which is in abutting contact with the upper end 18 of the casing 12. A second shoulder 54 is provided on the body 48 radially inwardly from the first shoulder 52. A tubular extension 56 extends downwardly from the second shoulder 54 and is provided with a cylindrical bore 57. The length of the tubular extension 56 is such that when the first shoulder 52 is in abutting contact with the upper end 18 of the casing 12, the free end of the tubular extension 56 is spaced from the upper surface of the wall 16 by space 58 which is in communication with an outlet port (not shown).

A sleeve 60 is disposed around the tubular extension 56. The sleeve 60 is provided with a flange 62 which is in abutting contact with the second shoulder 54 in the lefthand portion of FIGURE 1. A ring 64 is disposed within the bore 57 of the tubular extension 56. The ring 64 is integral with the sleeve 60 by a portion which extends through a longitudinal slot 66 in the tubular extension 56. A thin sleeve-like spacer 68 is disposed within the bore 57 and is supported by the ring 64. A helical spring 70 is disposed between the flange 62 on the sleeve 60 and an element 72 fixedly secured to the free end of the tubular extension 56 on its outer periphery. By way of illustration, the element 72 is shown as a stud in FIGURE 1. However, it will be clear to those skilled in the art that the element 72 may take a variety of shapes and forms including an annular ring which may be fixedly secured to the outer periphery of the tubular extension 56.

The cylindrical body 48 and the body 48' are each provided with a threaded bore through which extends the threaded bolt 74 which acts as an adjustable limit stop. The lowermost end of the bolt 74 cooperates with the flange 62 on the sleeve 60 to regulate the loading position of the plunger which is shown in phantom in the righthand side of FIGURE 1. The upper surface of the body 48 is provided with a counterbore coextensive with the bore 57. A ring 76 is mounted in the counterbore. The counterbore is provided with a well 78 which is in communication with a passage in the ring 76 and a passage 80 in the cylindrical body 48. The passage 80 communicates with a passage 82 which extends longitudinally along the casing 12. The passage 82 is provided with a threaded inlet 84 adapted to be placed in communication with a source of aerosolized lubricant.

The cylindrical body 48 is fixedly secured to the casing 12 by a pair of screws 86 which extend into threaded blind holes in the upper end 18 of the casing 12. By removal of the screws 86, the plunger positioner unit 46 is removable as a single unit. When it is desired to form glassware by the blow-and-blow method, the plunger positioner unit 46 is replaced by a quick change cartridge unit 88.

Figure 2:
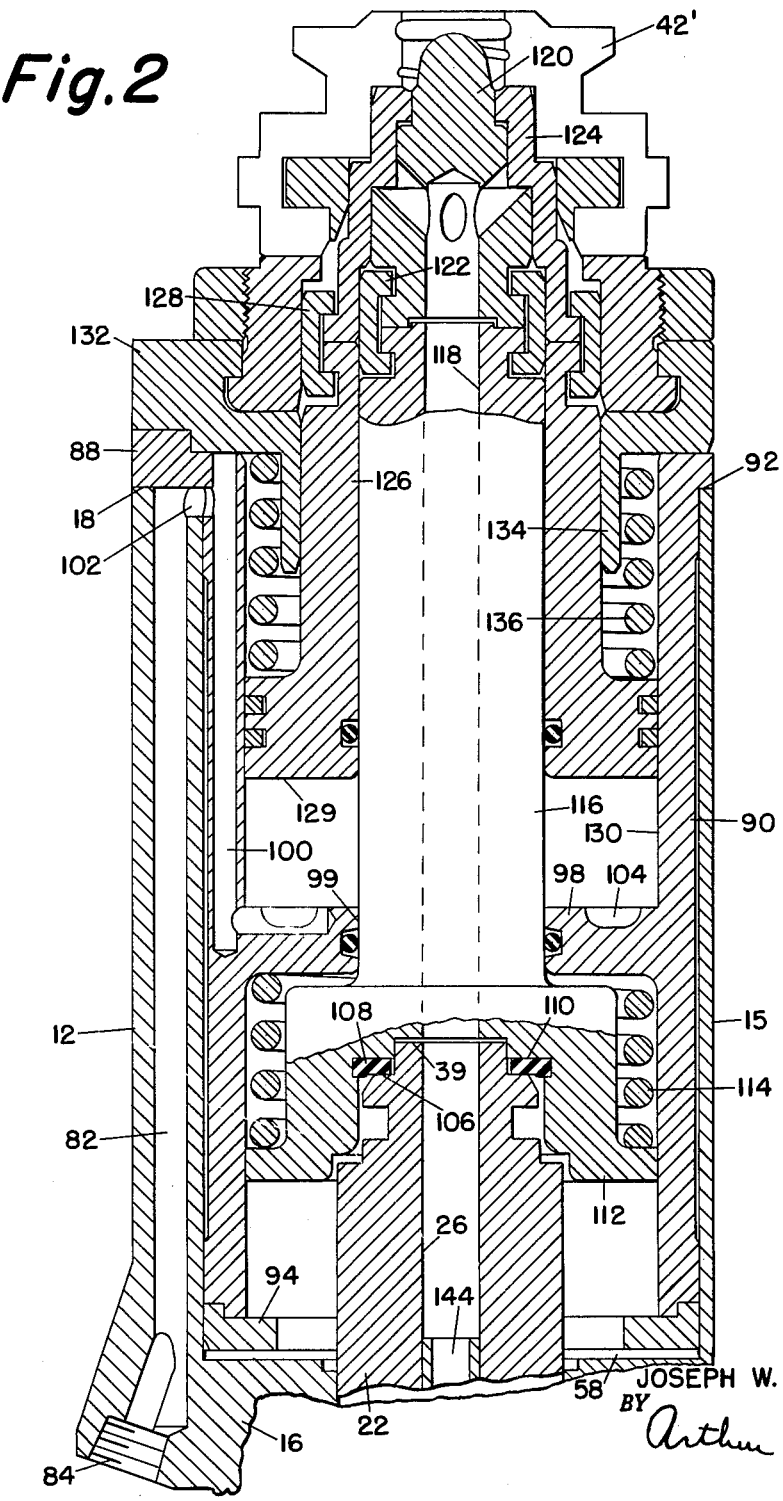
FIGURE 2 is a vertical sectional view through the upper portion of one-half of a parison forming assembly operable to form narrow-neck glassware by the blow-and-blow method.

As shown more clearly in FIGURE 2, the quick change unit 88 comprises a tubular cylindrical body 90 capable of being disposed within the bore 20 of the casing 12. The tubular body 90 is provided with a shoulder 92 which is in abutting contact with the upper end 18 of the casing 12. The tubular body 90 is provided with a flange 94 on its lowermost end which is spaced from the uppermost surface of the wall 16 by space 58. The internal bore in the tubular body 90 is divided into an upper chamber and a lower chamber by a wall 98 which is disposed intermediate the ends of the tubular body 90. The wall 98 is provided with a central bore 99. A passage 100 is provided in the wall of the tubular body 90 from the wall 98 upwardly to the hole 102 in the wall of the casing 12. The hole 102 places the passage 100 in communication with the passage 82. When the apparatus of the present invention is being used to form glassware by the press-and-blow method, the hole 102 performs no useful purpose and is blocked off by the portion of the body 48 extending between the first shoulder 52 and the second shoulder 54.

When the apparatus of the present invention is being used to make glassware by the blow-and-blow method, the inlet 84 to the passage 82 is adapted to be connected to a source of pressurized fluid which will be directed to the groove 104 in the wall 98 by way of passage 82, hole 102, and passage 100.

A washer 108 is positioned between the shoulder 106 on the upper end of the piston rod 22 and a shoulder 110 on the hub 112. A spring 114 extends between the lowermost surface of the wall 98 and a flange on the hub 112. The spring 114 maintains the shoulder 110 in contact with the washer 108. Thus, it will be seen that there is no direct mechanical connection between the upper end of the piston rod 22 and the hub 112. The hub 112 is provided with a tubular rod 116 which extends upwardly through the bore 99. The tubular rod 116 is provided with a longitudinal bore coextensive with the bore 26 in the piston rod 22. A neck pin 120 is fixedly secured to the upper end of the tubular rod 116 by split rings 122. A thimble 124 is fixedly secured to a piston rod 126 by split rings 128. The lowermost end of the piston rod 126 is integral with a piston 129 which is slidably mounted within the bore 130 in the tubular body 90. The piston 129 is provided with O-rings or gaskets on its inner and outer periphery so as to seal the contacting surfaces between the piston 129, the bore 130, and the outer periphery of the tubular rod 116.

The quick change unit 88 is provided with a head 132. The head 132 is provided with a tubular extension 134 which surrounds the piston rod 126. A spring 136 is disposed around the tubular extension 134 and between the cap 132 and the uppermost surface of the piston 129. The spring 136 exerts a pressure against the uppermost surface of the piston 129 tending to move the piston 129 toward the wall 98. A conventional blow-and-blow neck mold 42' is disposed on the uppermost surface of the quick change unit 88.

While only one casing has been shown in FIGURE 2, it will be appreciated that the apparatus of the present invention includes a pair of casings mounted on a single base-plate with the cylinder casings juxtaposed to one another as shown in FIGURE 1.

Referring to FIGURE 3, the cylindrical casing 12 is provided with a base 138. The base 138 is provided with a boss 139. The boss 139 is disposed within a counterbore 140 on the uppermost surface of a base-plate 141. The counterbore 140 is circular and is provided with a diameter slightly larger than the diameter of the circular boss 139. The casing 14 will also be provided with a boss (not shown) which will be received within a second counterbore on the uppermost surface of the base-plate 141. The base-plate 141 is provided with an integral jackscrew 142 on its lowermost surface. The jackscrew 142 is adapted to be connected to a drivescrew for adjusting the vertical position of the casings 12 and 14 simultaneously.

A hollow tube 144 is fixedly secured within a bore in the base 138. The outer diameter of the hollow tube 144 is slightly less than the diameter of the bore 26 in the piston rod 22. The piston rod 22 is disposed around the tube 144 so that coolant from conduit 146 may pass through the passage 148 in the base 138 up through the hollow tube 144 to cool the plunger 32. The coolant is then exhausted through an outlet port (not shown) which is in communication with space 58. When the apparatus of the present invention is being utilized to produce glassware by the blow-and-blow method, the conduit 146 will deliver pressurized air to the tube 144 which is in communication with the neck pin 120 by way of the bores 26 and 118 as shown more clearly in FIGURE 2.

A conduit 150 delivers pressurized fluid to a groove 154 on the uppermost surface of the base 138 by way of the passage 152. The pressurized fluid delivered by the conduit 150 selectively actuates the piston 156 which is fixedly secured to the piston rod 22 in any conventional manner such as the welding 157. Hereinafter, the piston 156 may be referred to as a variable chamber element. The lowermost end of the piston rod 22 is provided with a counterbore within which is disposed the bearing sleeve 158. An O-ring seal is disposed within a groove on the innermost surface of the bearing sleeve 158 so as to provide a seal between the piston rod 22 and the outer periphery of the hollow tube 144 in all positions of the piston rod 22. The outer periphery of the piston 156 is provided with grooves within which are disposed gaskets 160 which provide a seal between the piston 156 and the bore 20' in all positions of the piston 156. The pressurized fluid delivered by the conduit 150 causes the piston 156 and the piston rod 22 to move vertically upward. Another conduit (not shown) is in communication with the space within the bore 20' above the piston 156 for selectively delivering pressurized fluid for causing the piston 156 to move in a downward direction toward the base 138.

The last-mentioned conduit communicates with the chamber above the piston 156 at a point adjacent the lowermost surface of the wall 16.

Since each casing 12 and 14 is provided with a single piston 156, and since the plunger 32 is connected directly to the uppermost end of the piston rod 22, the length of stroke of the piston of the present invention is substantially increased over the length of stroke obtainable with the apparatus known heretofore. Since each of the cylindrical casings 12 and 14 and the cylindrical bodies on the plunger positioner units are provided with a flat portion on their juxtaposed surfaces, the longitudinal axis of the piston rods within the casings 12 and 14 are disposed further apart than the devices known heretofore. In addition, the flat portions on the casings 12 and 14 enable said casings to be independently adjustable relative to each other and the blank molds.

The apparatus for forming glassware of the present invention is utilized in the following manner:

When the apparatus of the present invention is used in the manufacture of glassware by the press-and-blow method, means are provided to close the blank molds on the neck ring molds 42. Immediately thereafter glass charges enter the molds and are positioned by baffle actuating mechanisms as is conventional in the art. Thereafter, pressurized fluid is admitted into the bore 20' below the piston 156 to raise the plungers 32 and 32' which press the glass charges into blanks. The lefthand portion of FIGURE 1 discloses the position of the plunger 32 when said plunger 32 is pressing a glass charge into a blank. The righthand portion of FIGURE 1 shows the position of the plunger 32' while the pressed blanks are being removed to a blow mold station (not shown). Pressurized fluid is admitted into the bore 20' immediately below the lowermost surface of the wall 16 to move the plunger from the position shown in the lefthand portion of FIGURE 1 to the position shown in the righthand portion of FIGURE 1.

As the plunger moves from the position shown in the lefthand portion of FIGURE 1 to the position shown in the righthand portion of FIGURE 1, the spring 70 is compressed due to the engagement between the washer 28 and the spacer 68. It will be seen that there is a direct mechanical interconnection between the washer 28 and the flange 62 which causes the spring 70 to be compressed when the plunger is in the position shown in the righthand portion of FIGURE 1. When the pressure above the piston 156 is relieved, the spring 70 expands until the flange 62 is in abutting engagement with the lowermost end of the bolt 74. The expansion of the spring 70 raises the plunger to the position shown in phantom at the righthand portion of FIGURE 1 which is the loading position. Thereafter, the plungers are activated to form a second glass charge in the manner set forth above.

When the plunger is at its loading position shown in phantom in FIGURE 1, the flange 62 assumes the phantom position in abutting engagement with the bolt 74. Adjustment of the bolt 74 therefore results in an adjustment of the loading position of the plungers.

When it is desired to convert the apparatus of the present invention so as to produce narrow-neck glassware by the blow-and-blow method, the plunger positioner unit 46 is removed and the quick change unit 88 is substituted therefor. The plunger positioner unit 46 is removed by the removal of the screws 86. When the plunger 32 has been removed from the upper end of the piston rod 22, the plunger positioner unit 46 is withdrawn vertically and the quick change unit 88 is substituted therefor with the screws 86 being utilized to fixedly secure the quick change unit 88 within the casing 12. As soon as the screws 86 have been adjusted to fixedly secure the quick change unit 88, the apparatus is in condition for producing narrow neck glassware by the blow-and-blow method. The conversion of the apparatus of the present invention is quick and can be performed by the most unskilled labor.

When the apparatus of the present invention has been converted to the structure shown in FIGURE 2, narrow neck glassware will be manufactured in accordance with methods well known in the art. The apparatus shown in FIGURE 2 is in the settle blow position wherein the neck of the glassware is being formed. In this position, the piston 156 has been raised vertically by the pressure of the fluid within the bore 20' below the piston 156 and the chamber below piston 129 is in communication with a source of pressurized fluid. When the pressure below piston 156 is relieved, the spring 114 will expand and thereby move the neck pin 120 to the counterblow position. In the counterblow position the hub 112 will be in abutting contact with the flange 94. Also, air under pressure will be directed through the bores 26 and 118 to the neck pin 120.

When the pressure below the piston 129 is relieved, the spring 136 will expand and thereby move the thimble 124 to the inverting position. In the inverting position, the piston 129 will be in abutting contact with the uppermost surface of the wall 98. The significance of the settle blow, counterblow and inverting positions of the neck pin 120 and the corresponding effect on the formation of glassware will be readily apparent to those skilled in the art.

As used hereinafter, the plunger positioner unit 46 and the quick change unit 88 may be referred to as cartridge means adapted to be secured in the open end of a casing for selectively utilizing a piston rod in a press-and-blow operation and in a blow-and-blow operation. Alternatively, the units 46 and 88 may be referred to as a quick change cartridge unit. The external peripheral dimensions of the plunger positioner unit 46 and the quick change unit 88 are substantially identical and each unit is capable of being readily received within the bore 20 in the casing 12.

Thus, it will be seen that I have provided readily interchangeable cartridge means for converting an apparatus for forming glassware from a press-and-blow operation to a blow-and-blow operation.

The present invention may be embodied in other specific forms without departing from the spirit or essential attributes thereof and, accordingly, reference should be made to the appended claims, rather than to the foregoing specification as indicating the scope of the invention.

I claim:

1. In a glassware machine comprising a casing having an open end, a piston element in said casing, said piston element being secured to a piston rod, means for selectively reciprocating said piston element and piston rod longitudinally of said casing, a cartridge means adapted to be secured in said open end of said casing for selectively utilizing said piston rods in a press-and-blow operation and in a blow-and-blow operation, said cartridge means including a hollow body surrounding the upper end of said piston rod, an apertured wall in said body, said wall dividing said body into an upper and lower chamber, a hub within said lower chamber, said hub being adapted to be coupled to the upper end of said piston rod for movement therewith, a neck pin connected to said hub by an element extending through the aperture in said wall, and a piston means in said upper chamber connectable to a thimble adapted to surround said neck pin, and means for selectively reciprocating said piston means.

2. In a glassware machine in accordance with claim 1 wherein said means for selectively reciprocating said piston means includes a spring biasing said piston means towards said piston element.

3. In a glassware machine comprising a casing having an open end, a piston element in said casing, said piston element being secured to a piston rod, means for selectively reciprocating said piston element and piston rod longitudinally of said casing, a cartridge means adapted to be secured in said open end of said casing for selectively utilizing said piston rods in a press-and-blow operation and in a blow-and-blow operation, said cartridge means including a hollow body surrounding the upper end of said piston rod, an apertured wall in said body, said wall dividing said body into an upper and lower chamber, a hub within said lower chamber for connection to the upper end of said piston rod, a neck pin connected to said hub by an element extending through the aperture in said wall, and a piston means in said upper chamber connectable to a thimble adapted to surround said neck pin, means for selectively reciprocating said piston means, and a spring means biasing said hub toward said piston element.

4. In a glassware machine comprising a casing having an open end, a piston element in said casing, said piston element being secured to a piston rod, means for selectively reciprocating said piston element and piston rod longitudinally of said casing, a cartridge means adapted to be secured in said open end of said casing for selectively utilizing said piston rods in a press-and-blow operation and in a blow-and-blow operation, said cartridge means including a hollow body surrounding the upper end of said piston rod, an apertured wall in said body, said wall dividing said body into an upper and lower chamber, a hub within said lower chamber for connection to the upper end of said piston rod, a neck pin connected to said hub by an element extending through the aperture in said wall, and a piston means in said upper chamber connectable to a thimble adapted to surround said neck pin, and means for selectively reciprocating said piston means, said hub being in abutting contact with the upper end of said piston rod and free from any direct connection with said piston rod.

5. In a glassware machine comprising a pair of open ended casings juxtaposed to one another, a piston rod connected to a piston element in each casing, means for selectively and independently reciprocating said piston element in each casing, cartridge means removable as a unit in said open end of said casings for selectively utilizing said piston rod in the formation of open-mouthed glassware by the press-and-blow method and narrow neck glassware by the blow-and-blow method, said cartridge means including a hollow body insertable into the open end of said casings and adapted to be rigidly supported by said casings, spring means for biasing said piston rod relative to said body in one of the operative positions thereof, said spring means being disposed within said body, said body having a wall intermediate its ends, said spring means extending between said wall and a hub, said hub having a portion extending through said wall and a portion in abutting contact with the upper end of said piston rod.

6. In a glassware machine in accordance with claim 5 including a second spring means, one end of said second spring means abutting an inwardly projected element on said body and above said wall, the other end of said second spring means in abutting contact with a sleeve, said sleeve being mechanically interconnected with said piston rod, said wall being between said first and second spring means, and each spring means biasing said piston rod in the same direction.

7. A cartridge for insertion into the open end at the top of a casing of a glassware making machine wherein a piston rod is mounted in the casing for upright movement and will cooperate with the cartridge to make glassware by the blow-and-blow method, said cartridge comprising a hollow body open at the lower end, a wall extending across said hollow body intermediate its ends, said wall having an aperture which is centrally disposed with respect to said body, said wall dividing said body into an upper and a lower chamber, a hub within said lower chamber, said hub being adapted to be in abutting contact with the upper end of the piston rod and free from any direct connection with a piston rod, a neck pin connected to said hub by an element extending through the aperture in said wall, a piston in said upper chamber connectable to a thimble adapted to surround said neck pin, means in said chamber between said wall and said hub biasing said hub toward the open end of said hollow body, and a spring means in said upper chamber above said piston biasing said piston towards said hub, and said piston surrounding said element.

References Cited by the Examiner

UNITED STATES PATENTS

| | | | |
|---|---|---|---|
| 2,309,378 | 1/1943 | Berthold | 65—43 |
| 2,702,444 | 2/1955 | Rowe | 65—167 |
| 2,755,597 | 7/1956 | Rowe | 65—167 |

DONALL H. SYLVESTER *Primary Examiner.*

IVAN R. LADY, WILLIAM B. KNIGHT, HOWARD CAINE, *Examiners.*

D. M. PRITCHETT, P. GOLDSTEIN, C. VAN HORN, R. L. LINDSAY, *Assistant Examiners.*